United States Patent
Sugihara

(10) Patent No.: US 11,643,528 B2
(45) Date of Patent: May 9, 2023

(54) RUBBER COMPOSITION FOR HOSE AND HOSE

(71) Applicant: THE YOKOHAMA RUBBER CO., LTD., Tokyo (JP)

(72) Inventor: Koki Sugihara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 17/522,136

(22) Filed: Nov. 9, 2021

(65) Prior Publication Data

US 2022/0275178 A1 Sep. 1, 2022

(30) Foreign Application Priority Data

Feb. 26, 2021 (JP) .............................. JP2021-031127

(51) Int. Cl.
*C08L 15/00* (2006.01)
*C08L 9/02* (2006.01)
(Continued)

(52) U.S. Cl.
CPC .............. *C08L 15/005* (2013.01); *C08K 3/04* (2013.01); *C08K 5/14* (2013.01); *C08K 5/34924* (2013.01);
(Continued)

(58) Field of Classification Search
CPC ...... C08L 15/005; C08L 9/02; C08L 2203/18; C08F 236/12; C08F 279/04; C08K 3/04; F16L 11/04; B32B 1/08; B32B 2597/00
(Continued)

(56) References Cited

U.S. PATENT DOCUMENTS

2008/0156387 A1* 7/2008 Henry ...................... B32B 1/08
264/103
2008/0214741 A1* 9/2008 Guerin .................... C08C 19/08
525/329.1

(Continued)

FOREIGN PATENT DOCUMENTS

JP       2003-096241 A      4/2003
JP       2004018822 A   *   1/2004

OTHER PUBLICATIONS

Product data sheet for Therban LT 2157 published online by Arlanxeo Performance Polymers at https://www.arlanxeo.com/en/HNBR/Therban%C2% AE/p/therban-lt-2157# and accessed Sep. 27, 2022 (Year: 2022).*

(Continued)

*Primary Examiner* — Lee E Sanderson
(74) *Attorney, Agent, or Firm* — Carrier Shende & Associates, P.C.; Joseph P. Carrier; Anne G. Sabourin

(57) ABSTRACT

The present invention is to provide a rubber composition for a hose and the like, the rubber composition having excellent oil resistance and low-temperature performance. A rubber composition for a hose, the rubber composition comprising: a hydrogenated acrylonitrile butadiene rubber having an acrylonitrile amount of 24 mass % or less, a carbon black, a peroxide, and a triallyl isocyanurate; a content of the peroxide being 2.4 parts by mass or more per 100 parts by mass of the hydrogenated acrylonitrile butadiene rubber; and a content of the triallyl isocyanurate being 1.9 parts by mass or more per 100 parts by mass of the hydrogenated acrylonitrile butadiene rubber, and a hose formed by using the rubber composition for a hose.

10 Claims, 1 Drawing Sheet

(51) Int. Cl.
*C08K 3/04* (2006.01)
*C08K 5/3492* (2006.01)
*F16L 11/04* (2006.01)
*C08K 5/14* (2006.01)

(52) U.S. Cl.
CPC .................. *C08L 9/02* (2013.01); *F16L 11/04* (2013.01); *C08L 2203/18* (2013.01)

(58) Field of Classification Search
USPC .................................. 428/36.91, 36.9, 36.92
See application file for complete search history.

(56) References Cited

U.S. PATENT DOCUMENTS

| | | | | |
|---|---|---|---|---|
| 2009/0005275 | A1* | 1/2009 | Rosenbaum | C10M 171/02 508/110 |
| 2009/0312545 | A1* | 12/2009 | Werle | C07D 251/34 544/221 |
| 2015/0322254 | A1* | 11/2015 | Tsukada | C08L 15/005 524/35 |
| 2016/0376415 | A1* | 12/2016 | Kang | C08K 5/098 523/220 |
| 2018/0215906 | A1* | 8/2018 | Sugawara | C08K 5/11 |
| 2018/0251628 | A1* | 9/2018 | Sugawara | C08L 13/00 |
| 2020/0140595 | A1* | 5/2020 | Lieber | C08F 220/286 |

OTHER PUBLICATIONS

Product data sheet produced by the NOF Corporation for Perhexa 25B-40 and published online at http://www.geehorn.com/files/PDF44-_PERHEXA%2025B-40_.pdf accessed Sep. 27, 2022 (Year: 2022).*

* cited by examiner

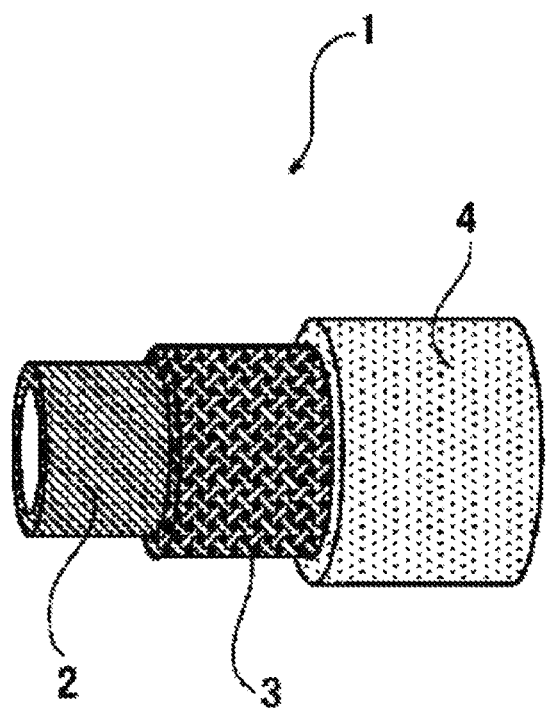

RUBBER COMPOSITION FOR HOSE AND HOSE

TECHNICAL FIELD

The present invention relates to a rubber composition for a hose and a hose.

BACKGROUND ART

In the related art, as a raw material for forming an inner tube for a power steering hose for an automobile, a rubber composition containing a hydrogenated acrylonitrile butadiene rubber (HNBR) has been used.

For example, Patent Document 1 describes, to provide a rubber composition or the like that has high heat resistance and high vibration absorption performance and that can be suitably used for a power steering hose and the like,
the rubber composition or the like containing
(1) from 90 to 20 parts by weight of a copolymer rubber containing, in a polymer chain, from 10 to 45 wt. % of a unit moiety formed from an unsaturated nitrile (Y moiety; VCN), from 0 to 5 wt. % of a unit moiety formed from a conjugated diene (Z moiety; C═C), and from 90 to 50 wt. % of a unit moiety obtained by hydrogenating a unit moiety formed from an ethylenic unsaturated monomer and/or a unit moiety formed from a conjugated diene, besides unsaturated nitrile, (X moiety; C—C);
(2) from 10 to 80 parts by weight of a chlorinated polyethylene rubber having a chlorination percentage of 25% or greater; and
(3) an organic peroxide,
a loss angle tangent (tan δ) at the time of forced stretching vibration at 5 Hz being 0.23 or greater in a temperature range from 0 to 10° C.

CITATION LIST

Patent Literature

Patent Document 1: JP 2003-96241 A

SUMMARY OF INVENTION

Technical Problem

For an inner tube of a power steering hose for an automobile, in addition to heat resistance, oil resistance is also required. Therefore, as HNBR contained in a rubber composition, high nitrile HNBR, such as HNBR having an acrylonitrile amount of 34 mass % or 36 mass %, is used.

However, there is a contradiction that a higher acrylonitrile amount of the HNBR results in a poorer performance of exhibiting viscoelasticity at a low temperature condition (hereinafter, this may be referred to as "low-temperature performance").

An object of the present invention is to provide a rubber composition for a hose, the rubber composition having excellent oil resistance and low-temperature performance.

Another object of the present invention is to provide a hose having excellent oil resistance and low-temperature performance.

Solution to Problem

As a result of diligent research to solve the problems described above, the inventors of the present invention found that desired effects can be achieved by a rubber composition containing a hydrogenated acrylonitrile butadiene rubber having an acrylonitrile amount of 24 mass % or less, carbon black, a peroxide, triallyl isocyanurate, contents of the peroxide and the triallyl isocyanurate each being in a specific range, and thus completed the present invention.

An embodiment of the present invention is based on the findings described above, and specifically solves the problems described above by the following configurations.

[1] A rubber composition for a hose, the rubber composition containing a hydrogenated acrylonitrile butadiene rubber having an acrylonitrile amount of 24 mass % or less, a carbon black, a peroxide, and a triallyl isocyanurate;
a content of the peroxide being 2.4 parts by mass or greater per 100 parts by mass of the hydrogenated acrylonitrile butadiene rubber; and
a content of the triallyl isocyanurate being 1.9 parts by mass or more per 100 parts by mass of the hydrogenated acrylonitrile butadiene rubber.

[2] The rubber composition for a hose according to [1], where a hydrogenation percentage of the hydrogenated acrylonitrile butadiene rubber is from 95 to 100%.

[3] The rubber composition for a hose according to [1] or [2], where a content of the carbon black is from 40 to 150 parts by mass per 100 parts by mass of the hydrogenated acrylonitrile butadiene rubber.

[4] The rubber composition for a hose according to any one of [1] to [3], where the acrylonitrile amount of the hydrogenated acrylonitrile butadiene rubber is from 18 to 22 mass %.

[5] The rubber composition for a hose according to any one of [1] to [4], where the content of the peroxide is from 2.8 to 6 parts by mass per 100 parts by mass of the hydrogenated acrylonitrile butadiene rubber.

[6] The rubber composition for a hose according to any one of [1] to [5], where the content of the triallyl isocyanurate is from 2.5 to 5.0 parts by mass per 100 parts by mass of the hydrogenated acrylonitrile butadiene rubber.

[7] The rubber composition for a hose according to any one of [1] to [6], further containing a diallyl compound.

[8] A hose formed by using the rubber composition for a hose according to any one of [1] to [7].

[9] The hose according to [8], further containing an inner tube formed by using the rubber composition for a hose.

[10] The hose according to [8] or [9], where a fluid having an aniline point of 105° C. or higher is flowed.

[11] The hose according to any one of [8] to [10], where the hose is for an automobile.

[12] The hose according to any one of [8] to [11], where the hose is for a power steering system pipe for an automobile.

Advantageous Effects of Invention

The rubber composition for a hose according to an embodiment of the present invention has excellent oil resistance and low-temperature performance.

The hose according to an embodiment of the present invention has excellent oil resistance and low-temperature performance.

BRIEF DESCRIPTION OF DRAWINGS

Illustrative FIGURE is a perspective view illustrating a cutaway of each layer of a hose that is a hose according to an embodiment of the present invention.

DESCRIPTION OF EMBODIMENTS

Embodiments of the present invention will be described in detail below.

Note that in the present specification, value range indicated by using "from . . . to . . . " means the range including the former value as a lower limit value and the latter value as an upper limit value.

In the present specification, unless otherwise indicated, a substance corresponding to each component can be used alone or in combination of two or more types thereof. In a case where a component includes two or more types of substances, content of component means the total content of the two or more types of substances.

In the present specification, the case where at least one of oil resistance or low-temperature performance is superior may be referred to as "exhibiting superior effect of the present invention".

Rubber Composition for Hose

The rubber composition for a hose according to an embodiment of the present invention (rubber composition according to an embodiment of the present invention) is a rubber composition for a hose, the rubber composition containing a hydrogenated acrylonitrile butadiene rubber having an acrylonitrile amount of 24 mass % or less, a carbon black, a peroxide, and a triallyl isocyanurate;

a content of the peroxide being 2.4 parts by mass or more per 100 parts by mass of the hydrogenated acrylonitrile butadiene rubber; and a content of the triallyl isocyanurate being 1.9 parts by mass or more per 100 parts by mass of the hydrogenated acrylonitrile butadiene rubber.

The rubber composition according to the present invention is thought to achieve desired effects as a result of having such a configuration. Although the reason is not clear, it is assumed to be as follows. That is, it is conceived that, by increasing a crosslinking density of the rubber after crosslinking by using specific ranges of amounts of peroxide as a crosslinking agent and triallyl isocyanurate as a co-crosslinking agent for a low nitrile HNBR having a low acrylonitrile amount (AN amount), volume swelling due to an oil of the rubber after crosslinking is prevented (oil resistance), and viscoelasticity can be exhibited at a low temperature (low-temperature performance).

The mechanism described above is a deduction of the present inventors, and the mechanism according to an embodiment of the present invention is not limited to that described above.

Each of the components contained in the rubber composition according to an embodiment of the present invention will be described in detail below.

Hydrogenated Acrylonitrile Butadiene Rubber

The rubber composition according to an embodiment of the present invention contains a hydrogenated acrylonitrile butadiene rubber (HNBR) having an acrylonitrile amount (AN amount) of 24 mass % or less.

The HNBR contained in the rubber composition according to an embodiment of the present invention is a hydrogenated product of a copolymer of acrylonitrile and butadiene.

The HNBR has an acrylonitrile group.

The hydrogenation of the HNBR is a hydrogenation in a main chain, and the hydrogenation may be partial hydrogenation or full hydrogenation.

Acrylonitrile Amount

In an embodiment of the present invention, the acrylonitrile amount (AN amount) contained in the HNBR is 24 mass % or less in the HNBR.

The AN amount of the HNBR is preferably from 18 to 22 mass % in the HNBR from the perspective of exhibiting superior effect of the present invention.

In an embodiment of the present invention, the acrylonitrile amount of the HNBR can be measured in accordance with the semimicro Kjeldahl method based on JIS K 6384.

Hydrogenation Percentage

The hydrogenation percentage of the HNBR is preferably from 95 to 100% in double bonds (present in a repeating unit derived from butadiene) contained in NBR before hydrogenation from the perspective of exhibiting superior effect of the present invention.

In an embodiment of the present invention, the hydrogenation percentage of the HNBR can be measured in accordance with JIS K 6235.

The rubber composition according to an embodiment of the present invention preferably contains only the HNBR described above as the rubber component from the perspective of exhibiting superior effect of the present invention.

The rubber composition according to an embodiment of the present invention preferably contains substantially no alloyed HNBR from the perspective of exhibiting superior effect of the present invention. The rubber composition according to an embodiment of the present invention containing substantially no alloyed HNBR means the amount of the alloyed HNBR being from 0 to 1.0 mass % in the total amount of the rubber composition according to an embodiment of the present invention.

Carbon Black

The carbon black is not particularly limited in an embodiment of the present invention.

Nitrogen Adsorption Specific Surface Area of Carbon Black

The nitrogen adsorption specific surface area of the carbon black is preferably from 5 to 50 $m^2/g$ from the perspective of exhibiting superior effect of the present invention.

In an embodiment of the present invention, the nitrogen adsorption specific surface area of the carbon black can be measured in accordance with JIS K 6217-2:2001.

Dibutyl Phthalate Oil Absorption of Carbon Black

From the perspective of exhibiting superior effect of the present invention, the dibutyl phthalate oil absorption of the carbon black is preferably from 25 to 130 mL/100 g, and more preferably from 50 to 120 mL/100 g.

The dibutyl phthalate oil absorption of the carbon black can be measured in accordance with JIS K 6217-4:2008.

Examples of the carbon black include carbon blacks of Fine Thermal Furnace (FTF) grade, Fast Extruding Furnace (FEF) grade, General Purpose Furnace (GPF) grade, and Semi-Reinforcing Furnace (SRF) grade.

A single carbon black can be used or a combination of two or more carbon blacks can be used.

From the perspective of exhibiting superior effect of the present invention, the combination of carbon blacks is preferably a combination of FEF grade carbon black and SRF grade carbon black.

Content of Carbon Black

From the perspective of exhibiting superior effect of the present invention, the content of the carbon black (when two or more types of carbon blacks are used in combination, total amount thereof) is preferably from 40 to 150 parts by mass, and more preferably from 80 to 120 parts by mass, per 100 parts by mass of the hydrogenated acrylonitrile butadiene rubber.

Peroxide

The peroxide contained in the rubber composition according to an embodiment of the present invention is not particularly limited as long as the peroxide can extract a proton from the HNBR.

Examples of the peroxide include benzoyl peroxide, dicumyl peroxide, di-t-butyl peroxide, t-butylcumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 1,3-bis(t-butylperoxypropyl)benzene, di-t-butylperoxy-diisopropylbenzene, t-butylperoxybenzene, 2,4-dichlorobenzoylperoxide, and 1,1-dibutylperoxy-3,3,5-trimethylsiloxane.

From the perspective of being capable of functioning as a crosslinking agent and exhibiting superior effect of the present invention, the peroxide preferably contains an organic peroxide having a plurality of peroxy groups and more preferably contains di-t-butylperoxide, 2,5-dimethyl-2,5-di(t-butylperoxy)hexane, 2,5-dimethyl-2,5-di(benzoylperoxy)hexane, 1,3-bis(t-butylperoxypropyl)benzene, or di-t-butylperoxy-diisopropylbenzene.

Content of Peroxide

In an embodiment of the present invention, the content of the peroxide is 2.4 parts by mass or more per 100 parts by mass of the hydrogenated acrylonitrile butadiene rubber.

From the perspective of exhibiting superior effect of the present invention, the content of the peroxide is preferably from 2.8 to 6 parts by mass, and more preferably from 3.0 to 5.0 parts by mass, per 100 parts by mass of the hydrogenated acrylonitrile butadiene rubber.

Triallyl Isocyanurate

The triallyl isocyanurate contained in the rubber composition according to an embodiment of the present invention is a compound having the following structure. The triallyl isocyanurate functions as a co-crosslinking agent and can crosslink the HNBR.

[Chemical Formula 1]

$$\begin{array}{c} \text{CH}_2=\text{CH}-\text{CH}_2-\text{N} \overset{\overset{\displaystyle O}{\|}}{\underset{\underset{\displaystyle O}{\|}}{\overset{\displaystyle C}{\diagdown}}} \text{N}-\text{CH}_2-\text{CH}=\text{CH}_2 \\ \text{CH}_2-\text{CH}=\text{CH}_2 \end{array}$$

Content of Triallyl Isocyanurate

In an embodiment of the present invention, the content of the triallyl isocyanurate is 1.9 parts by mass or more per 100 parts by mass of the hydrogenated acrylonitrile butadiene rubber.

From the perspective of exhibiting superior effect of the present invention, the content of the triallyl isocyanurate is preferably from 2.5 to 5.0 parts by mass, and more preferably from 3.0 to 4.0 parts by mass, per 100 parts by mass of the hydrogenated acrylonitrile butadiene rubber.

Diallyl Compound

The rubber composition according to an embodiment of the present invention preferably further contains a diallyl compound from the perspective of exhibiting superior effect of the present invention and achieving excellent elongation of the resulting rubber.

The diallyl compound is not particularly limited as long as the diallyl compound is a compound having two allyl groups. Examples thereof include aromatic compounds having two allyl groups, such as diallyl phthalate.

From the perspective of exhibiting superior effect of the present invention and achieving excellent elongation of the resulting rubber, the diallyl compound preferably contains diallyl phthalate.

Content of Diallyl Compound

From the perspective of exhibiting superior effect of the present invention, the content of the diallyl compound is preferably from 3.0 to 20 parts by mass, more preferably from 5.0 to 10.0 parts by mass, and even more preferably from 7.0 to 10.0 parts by mass, per 100 parts by mass of the hydrogenated acrylonitrile butadiene rubber.

Additives

The rubber composition according to an embodiment of the present invention can further contain additives, such as a plasticizer, an anti-aging agent, an antioxidant, an antistatic agent, a flame retardant, and an adhesion aid, in a range that does not impair the object of the present invention. The additives are not particularly limited. Examples thereof include known ones. The content of each additive is not particularly limited and can be appropriately selected.

The rubber composition according to an embodiment of the present invention can be a rubber composition containing substantially no sulfur. The rubber composition according to an embodiment of the present invention containing substantially no sulfur means the amount of the sulfur being from 0 to 0.5 mass % in the total amount of the rubber composition according to an embodiment of the present invention.

Production Method, Use, and the Like

The production of the rubber composition according to an embodiment of the present invention is not particularly limited. For example, an example is a method of producing the rubber composition according to an embodiment of the present invention by mixing the HNBR, the carbon black, the peroxide, and the triallyl isocyanurate, and optionally used diallyl compound and additives in a condition at 40 to 200° C. by using a closed mixer, such as Banbury mixer or kneader, or a roll kneader.

The condition for crosslinking the rubber composition according to an embodiment of the present invention is not particularly limited. For example, the rubber composition according to an embodiment of the present invention can be crosslinked while a pressure is applied in a condition at 110 to 160° C.

Rubber Composition for Hose

The rubber composition according to an embodiment of the present invention can be used for production of a hose. In particular, an example of a preferable aspect is one in which the rubber composition according to an embodiment of the present invention can be used for an inner tube of a hose.

Hose

The hose according to an embodiment of the present invention is a hose formed by using the rubber composition for a hose according to an embodiment of the present invention.

The rubber composition for a hose used in the hose according to an embodiment of the present invention is not particularly limited as long as the rubber composition is the rubber composition for a hose according to an embodiment of the present invention.

An example of a preferable aspect is one in which the hose according to an embodiment of the present invention has an inner tube formed by using the rubber composition for a hose described above.

Furthermore, an example of a preferable aspect is one in which the hose according to an embodiment of the present invention has the inner tube described above, a reinforcing layer on the inner tube, and an outer tube on the reinforcing layer.

Hereinafter, the hose according to an embodiment of the present invention is described based on the attached drawing; however, no such limitation is intended for the hose according to an embodiment of the present invention.

The illustrative FIGURE is a perspective view illustrating a cutaway of each layer (each tube) of a hose that is a hose according to an embodiment of the present invention.

In the illustrative FIGURE, a hose 1 has an inner tube 2, a reinforcing layer 3 on the inner tube 2, and an outer tube 4 on this layer. The inner tube 2 is preferably formed from the rubber composition according to an embodiment of the present invention.

The inner tube 2 preferably forms the innermost layer of the hose. The thickness of the inner tube 2 can be freely designed based on need and, for example, preferably approximately from 0.5 to 5.0 mm, and preferably from 0.8 to 3.0 mm.

Furthermore, the hose according to an embodiment of the present invention may optionally contain a reinforcing layer 3. The case where the hose according to an embodiment of the present invention has a reinforcing layer is preferred because tensile strength at break, usable pressure range, and metal mountability of the hose are enhanced. Examples of the reinforcing layer include structures in a blade form, helical form, net form, or film form. Examples of the material of the reinforcing layer include yarn of organic materials such as of nylon, rayon, vinylon, polyester, and aramid fibers (reinforcing yarn); and metal wires such as brass-plated or zinc-plated steel wires.

The outer tube 4 forms the outermost layer of the hose. Examples of the material that can form the outer tube 4 include rubber compositions containing, for example, a butyl rubber, halogenated butyl rubber, ethylene propylene rubber, brominated isobutylene-p-methylstyrene copolymer rubber (BIMS), or ethylene-acrylate copolymer rubber (AEM). The thickness of the outer tube is, for example, preferably from 0.5 to 3 mm, and more preferably from 0.8 to 2 mm.

An example of the method of producing the hose according to an embodiment of the present invention is a method, in which the rubber composition according to an embodiment of the present invention in an unvulcanized state is arranged in a cylindrical form on a periphery of a mandrel or the like, a reinforcing layer is then arranged on the periphery thereof, a rubber composition for an outer tube is arranged in a cylindrical form on the periphery thereof, and then the entire hose is heated. The heating temperature is preferably 120° C. or higher, and more preferably from 140 to 170° C. After adequate cooling, by removing from the mandrel, the hose according to an embodiment of the present invention can be obtained.

An example of a preferable aspect is one in which the hose according to an embodiment of the present invention is used as a hose for an automobile.

Examples of the hose for an automobile include a power steering system pipe of an automobile.

The fluid passed through the inner portion of the hose according to an embodiment of the present invention is not particularly limited. Examples of the fluid include a fluid containing an oil having an aniline point of 90° C. or higher, and an example of a preferable aspect is a fluid containing an oil having an aniline point of 105° C. or higher.

EXAMPLES

An embodiment of the present invention will be described below in detail by way of examples. However, an embodiment of the present invention is not limited to such examples.

Production of the Rubber Composition

The components shown in Table 1 below were used in compositions (part by mass) shown in the same table and mixed by an agitator, and thus each of the rubber compositions was produced.

Note that, in the crosslinking agent row of Table 1, the number on the upper row is the amount of the product (PO 14-40) used as the crosslinking agent, and the number on the bottom row is the net amount of peroxide in the product used as described above.

Evaluation

The following evaluations were performed by using each of the rubber compositions produced as described above. The results are shown in Table 1.

Low-Temperature Performance

Production of Sample

Using a 148° C. press molding machine, each of the rubber compositions obtained as described above was vulcanized for 60 minutes under a surface pressure of 3.0 MPa, and thus a vulcanized sheet having a thickness of 2 mm was produced. An I-shaped sample was cut out from the sheet.

Low Temperature Elasticity Recovery Test

By using each of the samples produced as described above, a low temperature elasticity recovery test was performed in accordance with ASTM D 1329, and a temperature (TR-10) at which the elongation of each sample was recovered by 10% was measured.

Evaluation Reference

A case where the result of the low temperature elasticity recovery test was −25° C. or lower was evaluated as achieving excellent low-temperature performance.

In the case described above, a lower result of the low temperature elasticity recovery test indicates superior low-temperature performance.

On the other hand, a case where the result of the low temperature elasticity recovery test was higher than −25° C. was evaluated as exhibiting a poor low-temperature performance.

Oil Resistance

Production of Test Piece

Using a 148° C. press molding machine, each of the rubber compositions obtained as described above was vulcanized for 60 minutes under a surface pressure of 3.0 MPa, and thus a vulcanized sheet having a thickness of 2 mm was produced. A test piece was produced from the vulcanized sheet in accordance with JIS K 6258:2016.

Immersion Test

The immersion test in which each test piece was immersed in test oils 1 to 3 each having an aniline point in a condition at 135° C. for 168 hours was performed.

The volumes of the test pieces before and after the immersion in the test oils were measured, and the volume swelling ratio was calculated by the following equation from the measured values.

$$\text{Volume swelling ratio (\%)} = [(\text{volume after immersion} - \text{volume before immersion})/(\text{volume before immersion})] \times 100$$

Evaluation Reference

A case where the volume swelling ratio in the test oil 1 was 13% or lower, the volume swelling ratio in the test oil 2 was 10% or lower, and the volume swelling ratio in the test oil 3 was 3% or lower was evaluated as achieving excellent oil resistance.

In the case described above, when any one of the volume swelling ratio in the test oil 1, the volume swelling ratio in the test oil 2, or the volume swelling ratio in the test oil 3 was smaller, superior oil resistance was achieved.

On the other hand, a case where the volume swelling ratio in the test oil 1 was more than 13%, a case where the volume swelling ratio in the test oil 2 was greater than 10%, or a case where the volume swelling ratio in the test oil 3 was greater than 3% was evaluated as exhibiting poor oil resistance.

TABLE 1

| | | Example 1 | Example 2 | Example 3 | Comparative Example 1 | Comparative Example 2 | Comparative Example 3 | Comparative Example 4 | Example 4 | Example 5 | Example 6 | Example 7 | Example 8 |
|---|---|---|---|---|---|---|---|---|---|---|---|---|---|
| HNBR 1 | HNBR THERBAN LT 2007 AN 21%, hydrogenation percentage 99% | 100 | 100 | 100 | | 100 | 100 | | | 100 | 100 | 100 | 100 |
| HNBR 2 | HNBR THERBAN LT 2057 AN 21%, hydrogenation percentage 95% | | | | | | | | | | | | |
| Comparative HNBR | HNBR ZETPOL 2000L AN 36% | | | | 100 | | | | | | | | |
| Carbon black 1 | FEF C.B | 40 | 40 | 40 | 40 | 40 | 40 | | | | | | |
| Carbon black 2 | SRF C.B | 50 | 50 | 50 | 50 | 50 | 50 | | | | | | |
| Silica | Silica | 5 | 5 | 5 | 5 | 5 | 5 | | | | | | |
| Adhesion promoter | MgO | 10 | 10 | 10 | 10 | 10 | 10 | | | | | | |
| Anti-aging agent | MBZ | 1.5 | 1.5 | 1.5 | 1.5 | 1.5 | 1.5 | | | | | | |
| Crosslinking aid | ZnO | 2 | 2 | 2 | 2 | 2 | 2 | | | | | | |
| Processing aid | Stearic acid | 1 | 1 | 1 | 1 | 1 | 1 | | | | | | |
| Co-crosslinking agent 1 | TAIC (pure product) | 3.5 | 2.7 | 1.9 | 3.5 | 3.5 | 3.5 | | | | | | |
| Co-crosslinking agent 2 | DAP | 8 | 8 | 8 | 8 | 8 | 8 | | | | | | |
| Crosslinking agent | PO 14-40 (net amount of peroxide) | 8.5 (3.4) | 8.5 (3.4) | 8.5 (3.4) | 8.5 (3.4) | 5 (2) | 2 (0.8) | | | | | | |
| Low-temperature performance | Low temperature elasticity recovery test TR-10 (° C.) | −30 | −30 | −30 | −21 | −31 | −33 | | | | | | |
| OIL RESISTANCE Oil resistance test 135° C. × 168 h | Test oil 1, aniline point: 99° C. | 11.8 | 12.3 | 12.8 | 5 | 13.2 | 14.7 | | | | | | |
| | Test oil 2, aniline point: 117° C. | 8.5 | 9 | 9.5 | 2.8 | 10 | 11.5 | | | | | | |
| | Test oil 3, aniline point: 124° C. | 2.2 | 2.4 | 2.6 | −2 | 3.7 | 4.5 | | | | | | |

TABLE 1-continued

| | | | | | | | |
|---|---|---|---|---|---|---|---|
| HNBR 2 | HNBR THERBAN LT 2057 AN 21%, hydrogenation percentage 95% | | 100 | | | | |
| Comparative HNBR | HNBR ZETPOL 2000L AN 36% | | | | | | |
| Carbon black 1 | FEF C.B | 40 | 40 | 40 | 40 | 30 | 50 |
| Carbon black 2 | SRF C.B | 50 | 50 | 50 | 50 | 50 | 50 |
| Silica | Silica | 5 | 5 | 5 | 5 | 5 | 5 |
| Adhesion promoter | MgO | 10 | 10 | 10 | 10 | 10 | 10 |
| Anti-aging agent | MBZ | 1.5 | 1.5 | 1.5 | 1.5 | 1.5 | 1.5 |
| Crosslinking aid | ZnO | 2 | 2 | 2 | 2 | 2 | 2 |
| Processing aid | Stearic acid | 1 | 1 | 1 | 1 | 1 | 1 |
| Co-crosslinking agent 1 | TAIC (pure product) | 1.1 | 3.5 | 3.5 | 3.5 | 3.5 | 3.5 |
| Co-crosslinking agent 2 | DAP | 8 | 8 | 6 | 4 | 8 | 8 |
| Crosslinking agent | PO 14-40 | 8.5 | 8.5 | 8.5 | 8.5 | 8.5 | 8.5 |
| | (net amount of peroxide) | (3.4) | (3.4) | (3.4) | (3.4) | (3.4) | (3.4) |
| Low-temperature performance | Low temperature elasticity recovery test TR-10 (° C.) | −32 | −31 | −30 | −31 | −31 | −29 |
| OIL RESISTANCE Oil resistance test 135° C. × 168 h | Test oil 1, aniline point: 99° C. | 13.3 | 12.5 | 12.5 | 12.9 | 12.9 | 11.2 |
| | Test oil 2, aniline point: 117° C. | 10 | 9.5 | 9.4 | 9.8 | 9.8 | 8.2 |
| | Test oil 3, aniline | 2.8 | 2.8 | 2.5 | 2.8 | 2.8 | 2.0 |

Details of the components indicated in Table 1 are as follows.

HNBR

HNBR 1: Hydrogenated acrylonitrile butadiene rubber. Trade name: THERBAN LT 2007, available from ARLANXEO. AN amount: 21 mass %, hydrogenation percentage: 99%

HNBR 2: Hydrogenated acrylonitrile butadiene rubber. Trade name: THERBAN LT 2057, available from ARLANXEO. AN amount: 21 mass %, hydrogenation percentage: 95%

Comparative HNBR: Hydrogenated acrylonitrile butadiene rubber. Trade name: ZETPOL 2000L, available from Zeon Corporation. AN amount: 36 mass %, hydrogenation percentage: 99%

Carbon Black

Carbon black 1 (FEF): FEF carbon black (available from Nippon Steel Carbon Co., Ltd.); nitrogen adsorption specific surface area: 41 $m^2/g$; dibutyl phthalate oil absorption: 121 mL/100 g Carbon black 2 (SRF): SRF carbon black (trade name: Niteron #S, available from NSCC Carbon Co., Ltd.); nitrogen adsorption specific surface area: 25 $m^2/g$; dibutyl phthalate oil absorption: 72 mL/100 g Silica Adhesion promoter: Magnesium oxide (MgO)

Anti-aging agent: 2-Mercaptobenzimidazole (MBZ), NOCRAC MBZ, available from Ouchi Shinko Chemical Industrial Co., Ltd.

Crosslinking aid: Zinc oxide (ZnO), Zinc Oxide III, available from Seido Chemical Industry Co., Ltd.

Processing aid: Stearic acid. LUNAC YA, available from Kao Corporation

Co-crosslinking agent 1: TAIC (pure product). Triallyl isocyanurate. Trade name: TAIC, available from Nihon Kasei Co., Ltd.

Co-crosslinking agent 2: Diallyl phthalate (DAP), available from Daiso Co., Ltd.

Peroxide

Crosslinking agent: PO 14-40, available from Kayaku Akzo Corporation. A mixture of di-t-butylperoxy diisopropylbenzene and calcium carbonate. The content of di-t-butylperoxy diisopropylbenzene in the product is 40 mass %.

From the results shown in Table 1, Comparative Example 1, which contained no predetermined HNBR but, instead, contained an HNBR having an AN amount of more than 24 mass %, exhibited poor low-temperature performance.

Comparative Examples 2 and 3 each having a content of the peroxide of less than the predetermined amount exhibited poor oil resistance.

Comparative Example 4 having a content of the triallyl isocyanurate of less than the predetermined amount exhibited poor oil resistance.

On the other hand, the rubber composition according to an embodiment of the present invention achieved excellent low-temperature performance and oil resistance.

REFERENCE SIGNS LIST

1 Hose
2 Inner tube
3 Reinforcing layer
4 Outer tube

The invention claimed is:

1. A rubber composition for a hose, the rubber composition comprising:
   a hydrogenated acrylonitrile butadiene rubber having an acrylonitrile amount of 24 mass % or less, a carbon black, a peroxide, a triallyl isocyanurate, and a diallyl compound;
   a content of the peroxide being 2.4 parts by mass or more per 100 parts by mass of the hydrogenated acrylonitrile butadiene rubber;

a content of the triallyl isocyanurate being 3.5 to 5 parts by mass per 100 parts by mass of the hydrogenated acrylonitrile butadiene rubber; and a content of the diallyl compound being 7 to 20 parts by mass per 100 parts by mass of the hydrogenated acrylonitrile butadiene rubber; and the hydrogenated acrylonitrile butadiene rubber is a hydrogenated product of a copolymer consisting of acrylonitrile and butadiene.

2. The rubber composition for a hose according to claim 1, wherein a hydrogenation percentage of the hydrogenated acrylonitrile butadiene rubber is from 95 to 100%.

3. The rubber composition for a hose according to claim 1, wherein a content of the carbon black is from 40 to 150 parts by mass per 100 parts by mass of the hydrogenated acrylonitrile butadiene rubber.

4. The rubber composition for a hose according to claim 1, wherein the acrylonitrile amount of the hydrogenated acrylonitrile butadiene rubber is from 18 to 22 mass %.

5. The rubber composition for a hose according to claim 1, wherein the content of the peroxide is from 2.8 to 6 parts by mass per 100 parts by mass of the hydrogenated acrylonitrile butadiene rubber.

6. A hose formed by using the rubber composition for a hose according to claim 1.

7. The hose according to claim 6, further comprising an inner tube formed by using the rubber composition for a hose.

8. The hose according to claim 6, wherein a fluid having an aniline point of 105° C. or higher is flowed.

9. The hose according to claim 6, wherein the hose is for an automobile.

10. The hose according to claim 6, wherein the hose is for a power steering system pipe for an automobile.

* * * * *